United States Patent [19]

Jarvis

[11] Patent Number: 4,842,298

[45] Date of Patent: Jun. 27, 1989

[54] SWAY BAR FOR ALL TERRAIN VEHICLE

[76] Inventor: Patrick Jarvis, 5744 Kinmore, Dearborn Heights, Mich. 48127

[21] Appl. No.: 161,734

[22] Filed: Feb. 29, 1988

[51] Int. Cl.$^4$ ............................................. B60G 19/00
[52] U.S. Cl. ................................... 280/689; 267/148; 267/154; 267/188; 267/273; 267/284; 280/695; 280/700; 280/723
[58] Field of Search ............... 267/188, 273, 274, 284, 267/148, 149, 154; 280/665, 689, 772, 723, 721, 700, 695

[56] References Cited

U.S. PATENT DOCUMENTS

| | | | |
|---|---|---|---|
| 1,691,217 | 11/1928 | Walden | 267/188 X |
| 2,734,742 | 2/1956 | Schwenk | 280/723 X |
| 2,888,257 | 5/1959 | Taylor | 267/148 X |
| 3,010,733 | 11/1961 | Melton et al. | 384/297 X |
| 3,085,817 | 4/1963 | Krause et al. | 280/723 |
| 4,243,247 | 1/1981 | Kataoka | 280/723 X |
| 4,261,591 | 4/1981 | Warne, Jr. | 280/721 X |
| 4,465,156 | 8/1984 | Richardson et al. | 267/273 X |
| 4,473,238 | 9/1984 | Aubry | 267/149 X |
| 4,491,342 | 1/1985 | Aubry | 267/284 X |
| 4,659,069 | 4/1987 | Odobasic | 280/723 X |

FOREIGN PATENT DOCUMENTS

| | | | |
|---|---|---|---|
| 3612777 | 10/1987 | Fed. Rep. of Germany | 267/148 |
| 46130 | 4/1981 | Japan | 267/154 |
| 802404 | 10/1958 | United Kingdom | 267/188 |

*Primary Examiner*—George E. A. Halvosa
*Attorney, Agent, or Firm*—Lloyd M. Forster

[57] ABSTRACT

All Terrain Vehicle (ATV) sway bar constructed with plastic tubular carrier solid nylon torsion bar and/or aluminum alloy torsion bar assembled end levers and a pair of independent laterally adjustable steel brackets for mounting the carrier to the ATV frame.

8 Claims, 1 Drawing Sheet

SWAY BAR FOR ALL TERRAIN VEHICLE

BACKGROUND OF THE INVENTION

Sway bars are designed to counteract centrifugal forces when cornering on an ATV, thereby preventing the inside rear wheel from lifting off the ground, keeping all four wheels on the ground in tracking when making a turn, and allowing the vehicle to corner considerably faster. In effect, the sway bar provides a torsional transverse connection between the independent sprung suspensions of a pair of front ground wheels which allows both wheels to spring together, without interaction by the sway bar, in meeting uniform irregularities in the terrain during straight-away driving while providing interaction to share in resisting spring deflection imposed through the outer wheel incident to centrifugal force during a turn to transmit such deflection to the independent spring suspension of the inner wheel. Sway bars employing such principle are known in the art which employ steel tube carriers, steel tube torsion elements with steel levers welded to the ends and center brackets for mounting welded to the carrier. The torsion tubes are rigid providing negligibly torsional yield under operating conditions. Lubrication is required between the steel carrier and steel torsion tube.

BRIEF DESCRIPTION OF THE PRESENT INVENTION

A transverse solid cylindrical nylon bar having squared ends for square socket lever arm attachment comprises the torsional element of the present improved sway bar construction. A carrier for such bar is provided in the form of a heavy duty PVC plastic pipe with suitable close clearance ID for the nylon bar. Such materials require no lubrication for proper operation over durable lifespan requirements. The PVC pipe carrier is mounted on the frame of the vehicle by a pair of independently laterally adjustable steel brackets each having a sleeve encircling the PVC pipe with a set screw for retaining slidable adjustment and a rigid "L" or "U" bracket welded to the ring for bolting to an ATV frame.

Applicant's carrier and plastic torsion bar are substantially lighter than prior art all-steel sway bars. The nylon torsion element yields under rough track conditions, eliminating only approximately 50% of independent wheel suspension action. Respective ends of the cylindrical solid nylon bar are squared to fit in square sockets provided at the end of steel levers which are assembled by axial screws. An interchangeable rigid metal tube torsion element may be substituted for the nylon bar where desired for certain racing track conditions.

DETAILED DESCRIPTION OF PREFERRED EMBODIMENT

Figure 2:
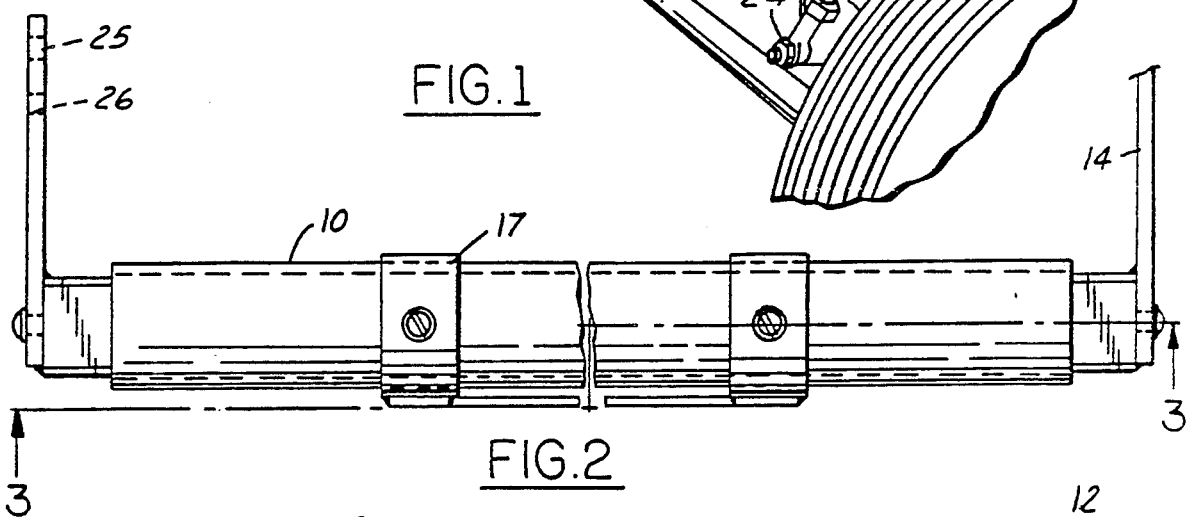
FIG. 2 is a plan view of the sway bar per se.
Figures 3, 3A:
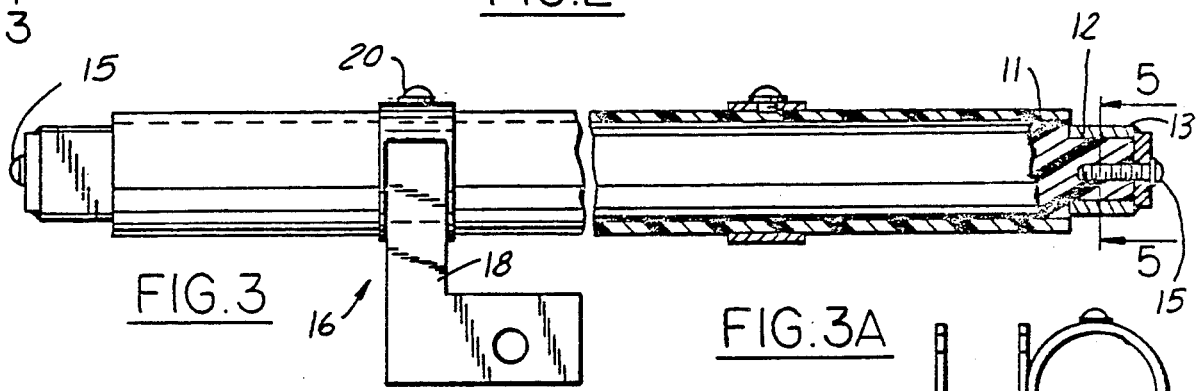
FIG. 3 is a partially sectioned end elevation of the sway bar taken along the line 3—3 of FIG. 2 including "L" clamps for frame attachment.
FIG. 3A is an end view of an alternative "U" clamp.
Figure 4:
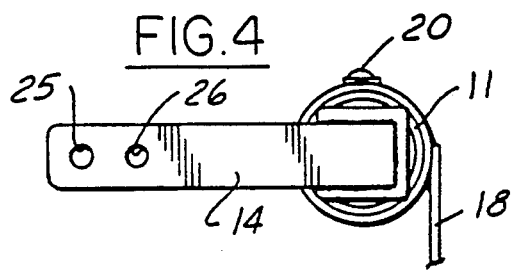
FIG. 4 is a side elevation showing the sway bar lever.
Figure 5:
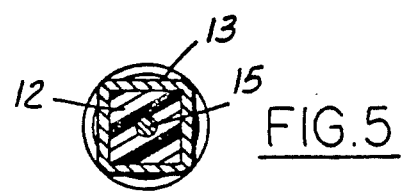
FIG. 5 is a sectional view taken along the line 5—5 of FIG. 3.

With reference to FIGS. 2 and 3, the present sway bar comprises PVC plastic carrier 10, solid nylon sway bar 11 having squared ends 12 fitting within square sockets 13 welded to lever arms 14 and assembled at the ends of sway bar 11 by screws 15.

A pair of relatively adjustable mounting brackets 16 are provided for carrier 10 each comprising steel sleeve 17 welded to steel L-member 18 having aperture 19 for bolting to the ATV frame. Set screw 20 is loosened for lateral displacement and proper alignment of brackets 16 and tightened for retention of the sway bar carrier 10 in mounted position on the ATV vehicle as illustrated in FIG. 1.

As illustrated in FIG. 3A, an alternative mounting bracket 21 may be substituted having U clamp 22 serving for attachment to a tubular frame member of the ATV vehicle.

Figure 1:
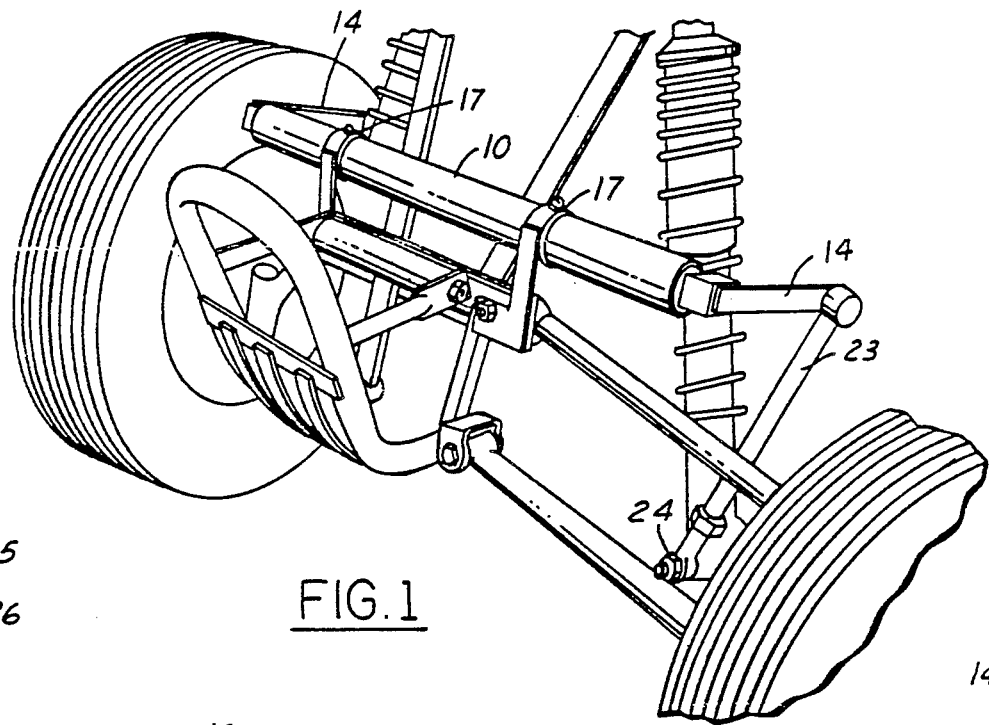
FIG. 1 is a perspective fragmentary view of the front end of an ATV equipped with applicant's sway bar.

As shown in FIG. 1, a connecting rod 23 extends between each lever 14 and lower shock spring mount 24 is adjustable in length to effect different requirements for different racing track conditions. For example, the connecting rods are adjustable to an equal neutral position for most track conditions but are preloaded right for left turns only on rough oval, smooth oval or ice tracks. Alternative holes 25 and 26 in lever arms 14 for connecting rod attachment are likewise variously employed for different track conditions. For example, the outer holes 25 on both levers are employed for rough MX, rough TT with switchbacks and rough oval track conditions while both inner lever holes 26 are employed for smooth MX, and smooth TT with switchback track conditions. For smooth, oval and ice tracks involving left turns only, outer hole connections 25 are used for the left connecting rod and inner hole 26 for the right.

The solid nylon sway bar provides limited torsional yield, preferably for rough tracks, to eliminate approximately 50% of independent wheel suspension spring action. As an alternative for smooth tracks, where a more rigid sway bar is preferred, an aluminum alloy torsion shaft may be substituted which eliminates approximately 95% of independent spring suspension. Such dual purpose is accommodated by the assembled construction of applicant's sway bar as compared with permanently welded construction of all steel prior art sway bars.

Sway bars employing the foregoing construction have been adapted for virtually all ATV race vehicles currently in commercial production using basic 1" diameter sway bar of either solid nylon or tubular aluminum alloy such as chromoly having a 0.156" wall thickness. Torsion bar lengths of 16, 22, 28 and 34 inches cover the complete range of ATV vehicles while end bracket levers in the range of 6–7" length have met all requirements. Standard adjustable connecting rods serve to complete the mounting assembly.

I claim:
1. Front end sway bar attachment to the front end frame of a four wheel ATV vehicle having independent front wheel suspension, comprising a single tube carrier, bracket means attaching said carrier rigidly to said frame, a closely fitted torsionally yieldable solid plastic torsion bar extending through said tube carrier with clearance for unlubricated rotary oscillation, a pair of end bracket lever arms torsionally connected to the end of said torsion bar projecting normally to its axis, a pair of connecting rod means adjustable in length connecting the ends of said lever arms and a lower shock mount sprung element of each front wheel suspension whereby unsymmetric centrifugal force spring loading at either wheel will be at least partially transmitted through the levers, torsion bar and connecting rod means to the spring suspension of the other wheel.

2. Sway bar of claim 1 wherein said torsion bar is constructed of nylon material.

3. Sway bar of claim 1 including means whereby said end bracket levers are removably assembled to the ends of said torsion bar.

4. Sway bar of claim 3 including interchangeable relatively yieldable and relatively rigid torsion bars provided for different racing road conditions.

5. Sway bar of claim 1 wherein said end bracket levers are removably assembled to the ends of said torsion bar through means of square torsion bar ends, square end socket brackets and screw retention means.

6. Sway bar of claim 1 wherein a pair of said bracket means for attaching said carrier are slidably adjustable relative to each other and to said carrier.

7. Sway bar of claim 1 wherein said bracket means for attaching said carrier to said frame comprise a pair of steel sleeves slidable on said tube each having a flat "L" member welded thereto.

8. Sway bar of claim 1 wherein said bracket means for attaching said carrier to said frame comprise a pair of steel sleeves slidable on said tube each having a "U" clamp welded thereto.

* * * * *